United States Patent [19]

Bagoy et al.

[11] 4,346,748

[45] Aug. 31, 1982

[54] TRACTION DEVICE FOR VEHICLES

[76] Inventors: John P. Bagoy; Joseph A. Riendl, both of 1730 W. 10th Pl., #4, Tempe, Ariz. 85281

[21] Appl. No.: 224,074

[22] Filed: Jan. 12, 1981

[51] Int. Cl.³ ..................... B60C 27/00; B60C 11/00
[52] U.S. Cl. .................................. 152/222; 152/179; 152/210; 152/221; D12/154
[58] Field of Search ............... 152/222, 221, 179, 184, 152/185.1, 187, 189, 225 R, 226–228, 210; D12/154; 238/14

[56] References Cited

U.S. PATENT DOCUMENTS

| | | | |
|---|---|---|---|
| D. 247,291 | 2/1978 | Gilmartin | D12/16 |
| 924,456 | 6/1909 | Stevenson | 152/221 |
| 1,326,513 | 12/1919 | Johnson | 152/221 X |
| 3,098,516 | 7/1963 | Vasiljevic | 152/222 X |
| 3,107,714 | 10/1963 | Zeitlin | 152/222 |
| 4,093,012 | 6/1978 | Detwiler | 152/222 X |
| 4,280,544 | 7/1981 | White | 152/179 X |

Primary Examiner—William A. Powell
Assistant Examiner—Thomas Bokan
Attorney, Agent, or Firm—Warren F. B. Lindsley

[57] ABSTRACT

An improved wheel-mounted traction device comprising a plurality of molded plastic traction elements held in place about the periphery of a wheel or tire by belts or cables that engage the individual traction elements. Metal studs, integral plastic projections and suction cavities are disclosed as additional means for aiding in achieving improved traction results.

9 Claims, 24 Drawing Figures

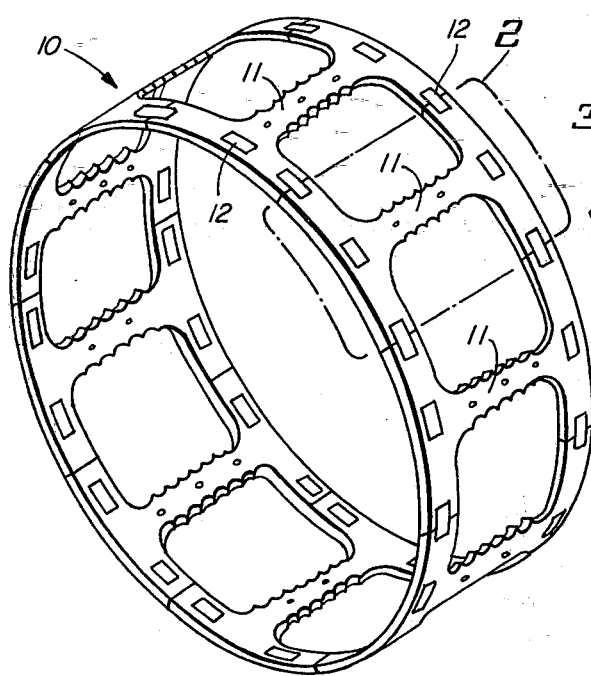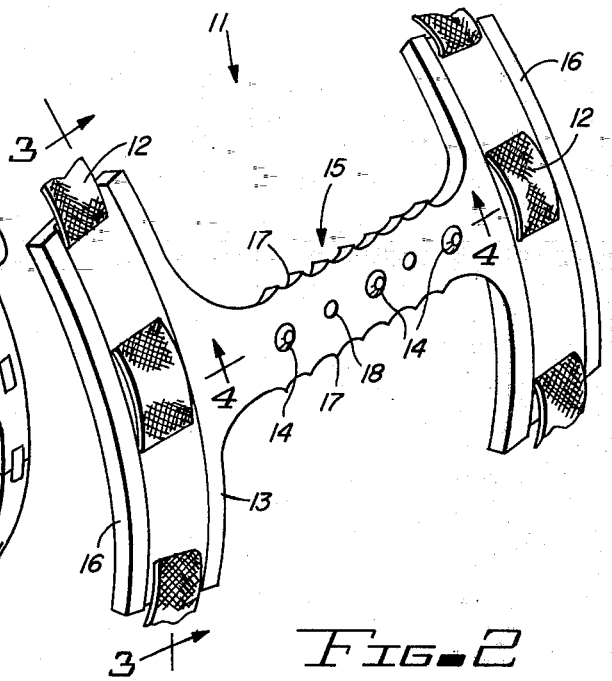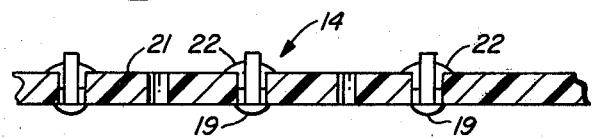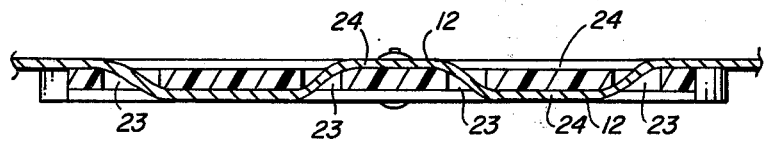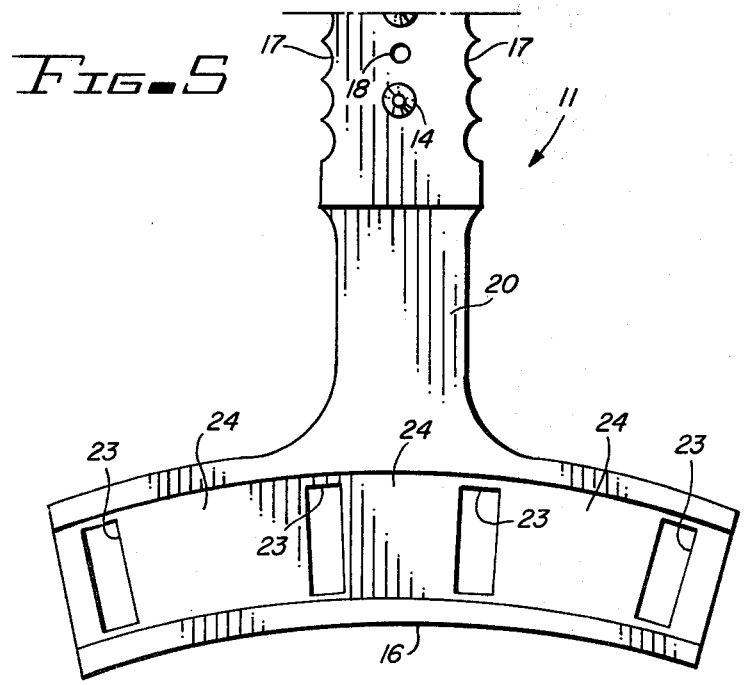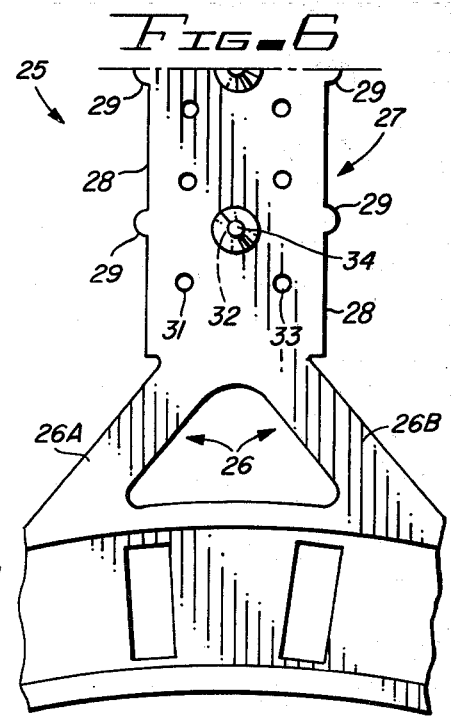

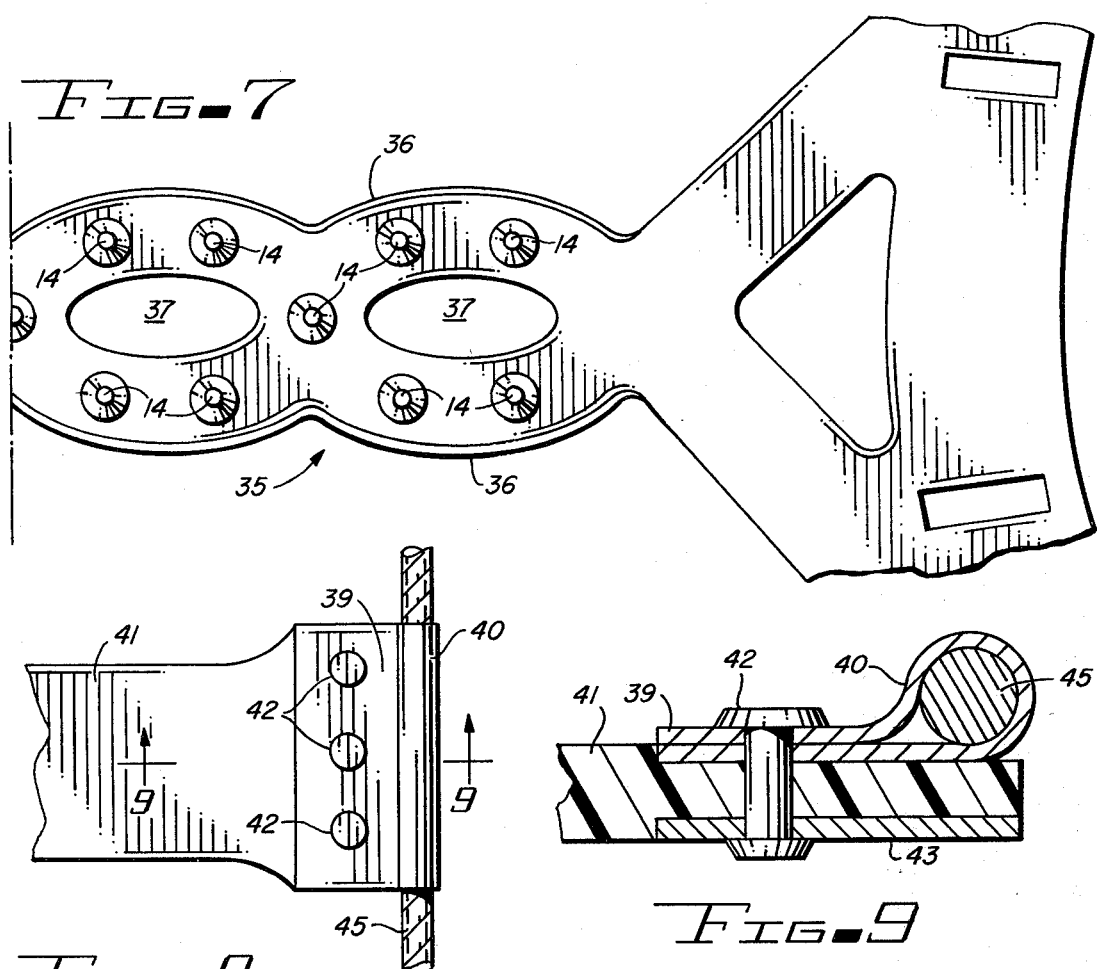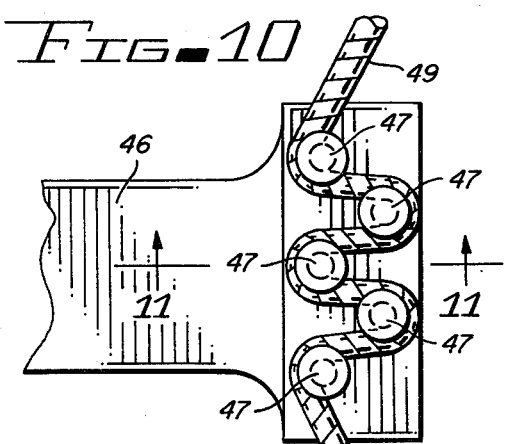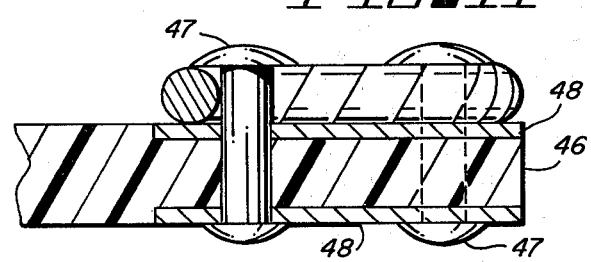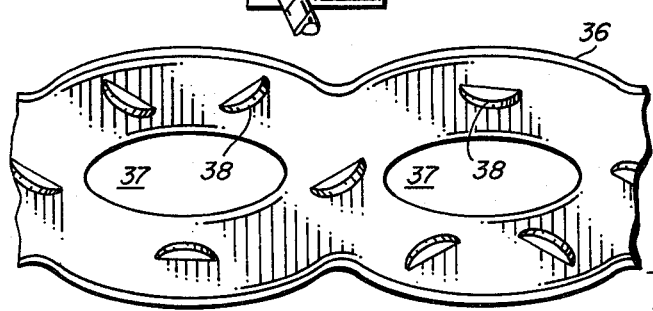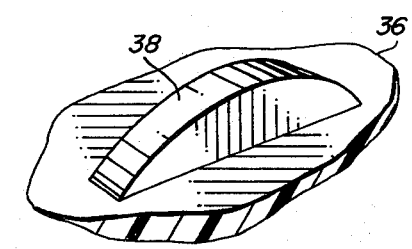

TRACTION DEVICE FOR VEHICLES

BACKGROUND OF THE INVENTION

This invention relates to removably mounted attachments for vehicle tires and more particularly to transversely positioned traction treads which grip the tires and the surface of the road to prevent skidding.

This application is an improvement over the subject matter of copending application Ser. No. 130,583 filed Mar. 14, 1980 by Fred C. White now U.S. Pat. No. 4,280,544 and assigned to the applicants of this application.

DESCRIPTION OF THE PRIOR ART

Anti-skid devices of various kinds including chains and individually mounted straps have been known. These devices usually formed of metal have been of limited road gripping value and have caused permanent damage to the road surface causing their use to have been prohibited in some areas. Additionally, these heavy and unwieldy chains have not only seriously injured the tires but failed to form a firm grip between the tire and the road surface to prevent sliding, slipping and skidding of the vehicle.

U.S. Patent Des. 247,291 discloses a transverse traction tread for vehicle tires the outer surface of which includes a plurality of pointed projections which are integrally formed with the traction element and wear rapidly due to road abrasion.

U.S. Pat. No. 923,456 discloses an anti-slip device consisting of an arch formed to fit transversely over the tread of a vehicle tire. Two openings are provided in each leg of the arch to receive a chain by means of which the arches are spaced apart and secured to the wheel rim in a known manner. The arch is provided with a tread having serrated edges.

U.S. Pat. No. 1,326,513 discloses an anti-skid device comprising a pair of draw members disposed along the sides of an automobile tire and a chain extending across the tread of the tire between the draw members. The cross chain comprises a center element from which radiates a series of arms each connected at its free end to one of the draw members. Each arm comprises a multiplicity of similar gripping elements each provided with an inner annular face adapted to lie against the tire for gripping the tire and the surface of the road.

SUMMARY OF THE INVENTION

It is, therefore, one object of this invention to provide a new and improved lightweight wheel mountable traction device for vehicles which increases the traction between a tire and the surface of a road.

Another object of this invention is to provide a new and improved wheel mountable traction device which is easy to install and remove and which will incur substantially less wear and loss of effectiveness than the known structures after prolonged use.

A further object of this invention is to provide a new and improved wheel mountable traction device formed by a plurality of individual treads, the treads being separately replaceable in the event of damage or wear.

A still further object of this invention is to provide a new and improved wheel mountable traction device employing a plurality of individual treads wherein the number of treads used is selected as appropriate to fit a given size of wheel.

A still further object of this invention is to provide a new and improved wheel mountable traction device employing lugs which may be replaced individually or in groups in the event of excessive wear or loss.

A still further object of this invention is to provide such a traction device in which the metal studs or cleats may be employed or conveniently removed as an accessory at the option of the user.

These and other objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing, in which:

FIG. 1 is a perspective view of a first embodiment of the improved wheel mountable traction device of the invention.

FIG. 2 is an enlarged perspective view of a single traction element employed in the device of FIG. 1, the element being shown in FIG. 1 is within the area enclosed by the broken line 2;

FIG. 3 is a cross-sectional view of FIG. 2 taken along the line 3—3;

FIG. 4 is a cross-sectional view of FIG. 2 taken along the line 4—4;

FIG. 5 is an enlarged plan view showing one half of the traction element of FIG. 2;

FIG. 6 is an enlarged plan view of a modification of the traction element shown in FIGS. 1-5 showing one half of a traction element;

FIG. 7 is an enlarged partial plan view showing another variation of a traction element which may be employed in the device of FIG. 1;

FIG. 8 is an enlarged partial view of another variation of the traction element in which a different means is employed for fastening or securing the element to a wheel;

FIG. 9 is a cross-sectional view of FIG. 8 taken along the line 9—9;

FIG. 10 is a partial plan view of another fastening means for a traction element;

FIG. 11 is a cross-sectional view of FIG. 10 taken along the line 11—11;

FIG. 12 is a partial plan view of still another variation of the traction element illustrating a modified form of the traction member;

FIG. 13 is an enlarged view of an individual lug incorporated in the surface of the traction element of FIG. 12;

DESCRIPTION OF THE PREFERRED EMBODIMENT

Figure 14:
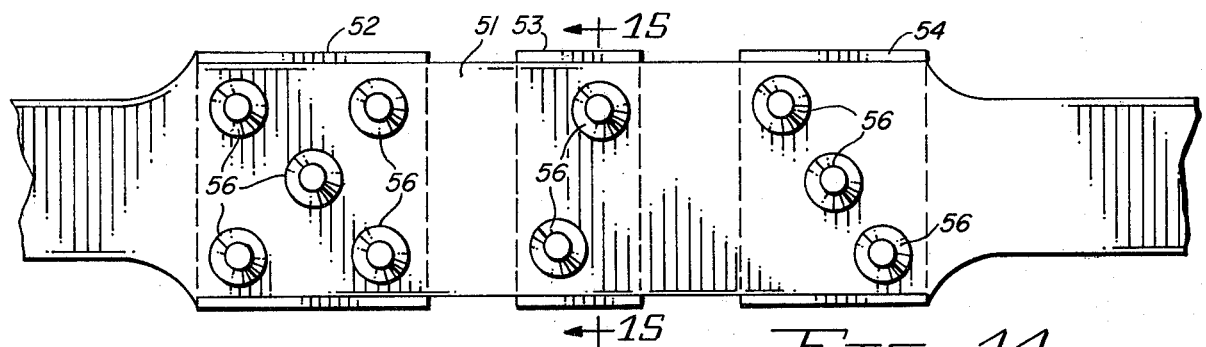
FIG. 14 is a plan view of still another variation of the traction element in which removable lug assemblies are incorporated.

Referring more particularly to the drawing by characters of reference, FIGS. 1-4 disclose an improved wheel mountable traction device 10 comprising a plurality of traction elements 11 secured together in an endless chain by means of two belts 12 encircling the wheel of a vehicle.

As shown more cleary in FIG. 2, each of the traction elements 11 comprises a plastic body 13 molded in the form of an upper-case letter H with metal studs or lugs 14 mounted in a horizontal cross or traction member 15. The two upright members 16 of the H-shaped configuration, functioning as the fastening members 16, are arcuate in shape curving outwardly at their ends. As apparent from FIG. 1, the cross member 15 serving a traction function extends laterally across the surface of the wheel or tire, parallel with the axis of rotation of the wheel. The two fastening members 16 fold around the tire, bending in area 20 of FIG. 5 so that the arcuate portions of member 16 lie against the sidewalls of the tire, their arcuate contours matching the curvature of the sidewalls of the tire over which they are superimposed.

The traction member 15 is rectangular in shape with its edges 17 serrated to aid in providing traction in snow or on other slippery surfaces. A row of holes 18 is provided along the longitudinal centerline of member 15 in which the studs 14 are mounted. These studs may be mounted in one or more of the holes 18 as desired. As shown in FIG. 4, studs 14 may be formed of any suitable hardened metal or ceramics in the form of rivets 19 that are installed from the underside of the traction member 15 and extend beyond the outer surface 21 to make contact with the surface of a road. A retainer collar 22 is press-fitted over the protruding end of the rivet. Alternatively, rivet 19 and collar 22 may be replaced by a suitable screw and nut configuration, respectively. In either case, the protruding end of the rivet or screw is intended to dig into an icy road surface to provide traction.

As best illustrated in FIGS. 1, 2, 3 and 5, the fastening members 16 are provided with a plurality of slots 23 arranged like the rungs of a ladder along the curved portion of member 16. These slots are arranged to receive the flexible belts or straps 12, which are preferably formed of woven nylon. As best illustrated in FIG. 3, belt 12 is recessed within cavities 24 formed in the inner and outer surfaces of member 16 in the areas lying between slots 23. The belt is laced through the slots passing first under member 16, then over, then under etc. as it emerges from successive slots 23. The lacing of belt 12 progresses from each traction member 16 to the next until the total circumferential path around device 10 is completed. The two adjacent ends of belt 12 are then joined by means of a buckle, not shown in the drawing. As noted from FIGS. 1 and 2, two belts are employed, one around the inner side of the wheel of a vehicle and one around the outer side thereof.

Traction device 10 is applied in much the same manner as a conventional tire chain; however, since it is relatively light in weight compared to a metal chain, it may be much more easily installed than a chain. As the wheel on which it is mounted rolls along a road surface, lugs 14 cut into the ice surface and provide the desired traction.

In the variation of FIG. 6 a modified traction element 25 is provided. The bending area 26 is strengthened relative to area 20 of FIG. 5 through the utilization of slanted or cross-braced supports 26A and 26B. By virtue of the strengthened or stiffened support afforded the traction member 27, there will be less tendency for member 27 to be moved out of position under the forces applied to it by the power-driven wheel. A modified edge 28 is also employed in this case utilizing extending integral tabs 29 to afford traction in opposition to lateral motion of the wheel. Instead of a single row of holes, three rows of holes, 31, 32 and 33, are provided for the installation of studs 34. It should again be noted that these studs are not necessarily installed in all of the holes, 18, 31, 32 or 33. Under certain surface conditions the holes themselves are effective in providing traction.

Additional variations of the traction member are shown in FIGS. 7, 12 and 13. In FIG. 7 a flat studded open chain 35 is provided with traction afforded by studs 14 or 34 as well as by the outside edges 36 and by the central openings 37 of the chain 35. In FIGS. 12 and 13 the contours of the open chain are retained, but protruding integral plastic tabs 38 are substituted for the metal or ceramic studs.

FIGS. 8 and 9 illustrate the use of a cable clamp 39 as an alternate means for securing the traction elements to the wheel. The cable clamp 39 is formed by folding a square or rectangular sheet of metal or sturdy plastic back on itself leaving a loop 40 at the fold. The loop 40 provides a substantially cylindrical opening for a cord or cable. Clamps 39 are secured at both ends of traction member 41 by means of rivets 42 with the orientation of clamp 39 being arranged so that the axis of the cylindrical opening through loop 40 is perpendicular to the main axis of element 41. A metal backup plate 43 adds strength to the riveted attachment, the plate 43 being secured to the surface of member 41 opposite clamp 39 by the same rivets 42. In the use of clamp 39 to secure the traction members in position, the ends of the traction elements are again folded over the edge of the tire toward the sidewall of the tire so that loops 40 are in general alignment with the tire sidewalls. A sturdy cable or cord 45 is passed through loops 40 of the several traction elements to complete the assembly of a traction device similar to device 10 of FIG. 1. The two ends of cable 45 are then secured together by means of a cable clamp or other means (not shown) to complete the mounting of the device to the wheel of a vehicle.

FIGS. 10 and 11 illustrate yet another means for securing the traction elements to the wheel of a vehicle. At each end of traction member 46 a plurality of large-headed rivets 47 are installed. These rivets are passed through two reinforcing or back-up plates 48 with the two plates 48 being positioned opposite each other, one on the front and one on the rear surface of member 46. A cable or cord 49 is passed under the extending heads of rivets 47 on the outside surface of member 46 with the cable passing successively in a serpentine fashion under the heads of several of the rivets as shown in FIG. 10. The serpentine path of cable 49 through the formation of rivets causes the cable to wrap partially around each of the rivets thereby assuring a more secure attachment of the cable to the rivets. The ends of the traction members 46 again fold around the tire toward the sidewalls where they are securely held by cable 49 as described earlier in connection with the variation of FIGS. 8 and 9.

Figure 15:
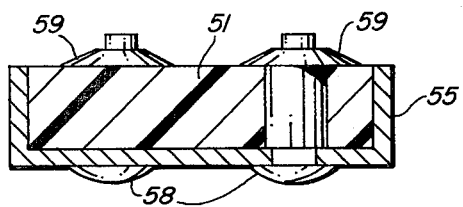
FIG. 15 is a cross-sectional view of FIG. 14 taken along the line 15—15.
Figure 16:
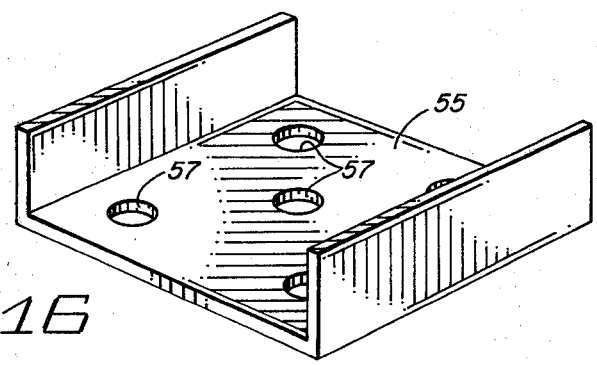
FIG. 16 is an enlarged perspective view showing a part of the lug assembly of FIGS. 14 and 15.

FIGS. 14—16 disclose another variation of the traction member wherein traction member 51 utilizes replaceable stud assemblies 52, 53 or 54. Each of the assemblies 52, 53 and 54 comprises a channel-shaped bracket 55 and a set of studs 56. The bracket 55 wraps around the back surface and around the leading and trailing edges of the traction member 51. Several holes 57 (two, three or five as shown, respectively in assemblies 52, 53 and 54) are provided in an appropriate pattern in bracket 55 to receive studs 56, each of which comprises a rivet 58 and a press-fit cap 59. The rivets 58 formed of any suitable metal or ceramics are passed through the brackets 55 from the rear or underside and then through aligned holes in the plastic body of traction member 51. The caps 59 are then installed over the protruding ends of rivets 58 to complete the mounting of assembly 52, 53 or 54 to member 51. The dimensions of brackets 55 and the number of studs 52 may be selected as appropriate for a wheel or tire of a given size. It should be noted that the bracket shown in FIGS. 14-16 may be molded in a surface of the traction member, if so desired.

Figure 17:
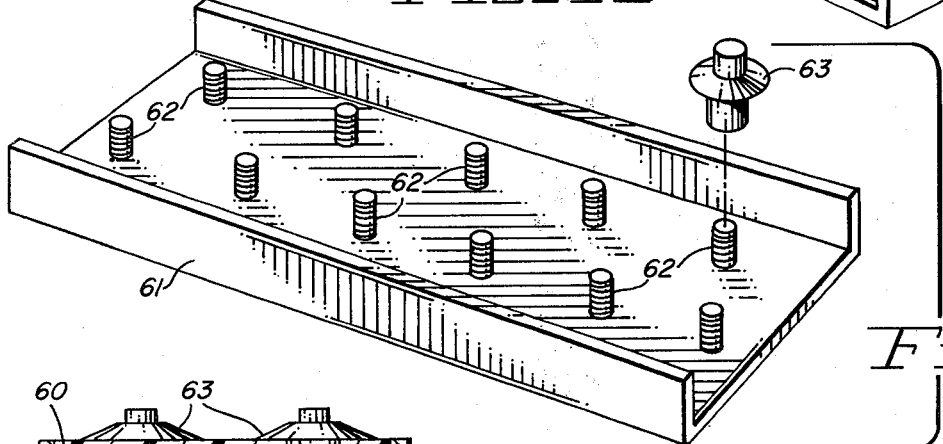
FIG. 17 is a perspective exploded view of an alternate removable lug assembly which may be employed in a manner similar to the application of the lug assembly of FIGS. 14-16.
Figure 18:
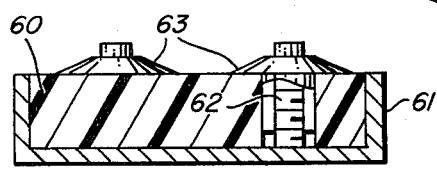
FIG. 18 is a cross-sectional view of the lug assembly of FIG. 17 as attached to a traction member.

FIGS. 17 and 18 illustrate a variation of the replaceable stud assembly just described. In the variation of FIGS. 17 and 18 a bracket 61 is equipped with a plurality of sets of posts 62 that are integrally formed with bracket 61. These posts are attached permanently to the bracket in the desired arrangement or pattern using some process such as welding or press-fitting. Bracket 61 is then mounted to traction member 60 by passing the posts through aligned holes in the traction member so that bracket 61 is again positioned on the under or rear side of traction member 60. Caps 63 are then secured over the protruding ends of posts 62. Press-fit or threaded screw attachments of caps 63 to posts 62 also may be employed.

Figure 20:
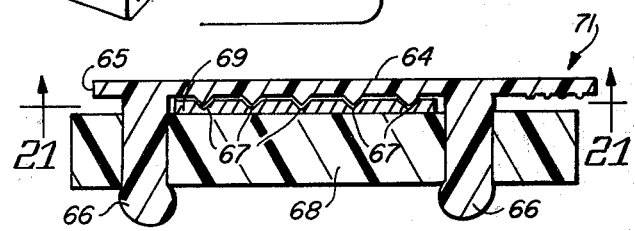
FIG. 20 is a cross-sectional view of FIG. 19 taken along the line 20—20.
Figure 19:
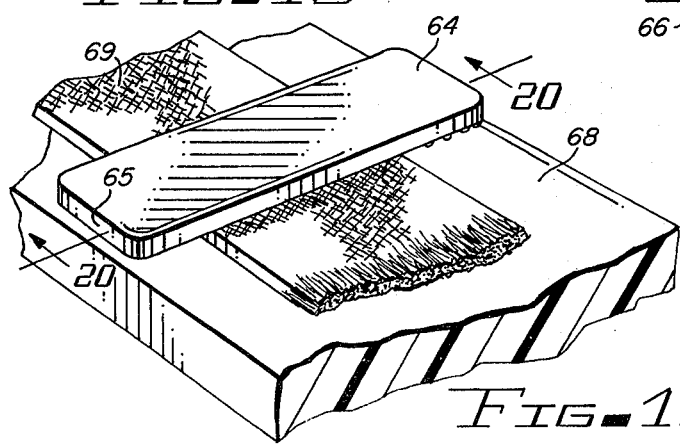
FIG. 19 is a partial perspective view of a device intended to be secured to one of the traction elements for use in holding the end of a fastening strap to prevent it from being thrown about as the wheel revolves.
Figure 21:
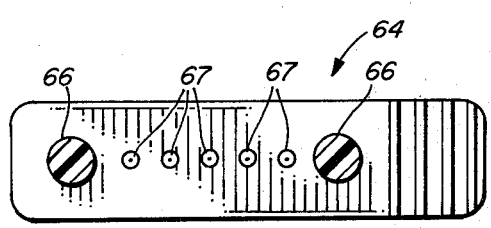
FIG. 21 is a cross-sectional view of FIG. 20 taken along the line 21—21.

When a belt is employed to secure the traction elements in place over the wheel or tire, the ends of the belts extending from the buckle or other fastener will fly around and become tattered and torn as the wheel turns unless the ends of the belts are secured by some means. FIGS. 19-21 illustrate a simple and convenient means for securing the end of the belts. This means comprises a plastic or metal clip 64 having a flat rectangular body 65 with two attachment posts 66 and a row of pointed projections 67 extending perpendicularly from one surface thereof. The posts 66 are passed through two appropriately spaced holes conveniently located on the fastening member 68 of the traction element and are secured therein by blunting the protruding ends of the posts or by some other suitable means. The loose end of belt 69 is passed under the body 65 of clip 64, between the surface of member 68 and the pointed projections 67, so that the projections 67 bite into the material of the belt 69 and hold it securely in place. One end of body 65 extends beyond the adjacent post 66 and past the edge of member 68 so that its extending end 71 may be raised by finger pressure to disengage belt 69 from projections 67 when it is desired to remove the traction device from the wheel. In a modified design or arrangement the projection 71 may be pressed against member 68 to cause the center of body 65 to be bowed upward as an alternate means for releasing belt 69.

Figure 22:
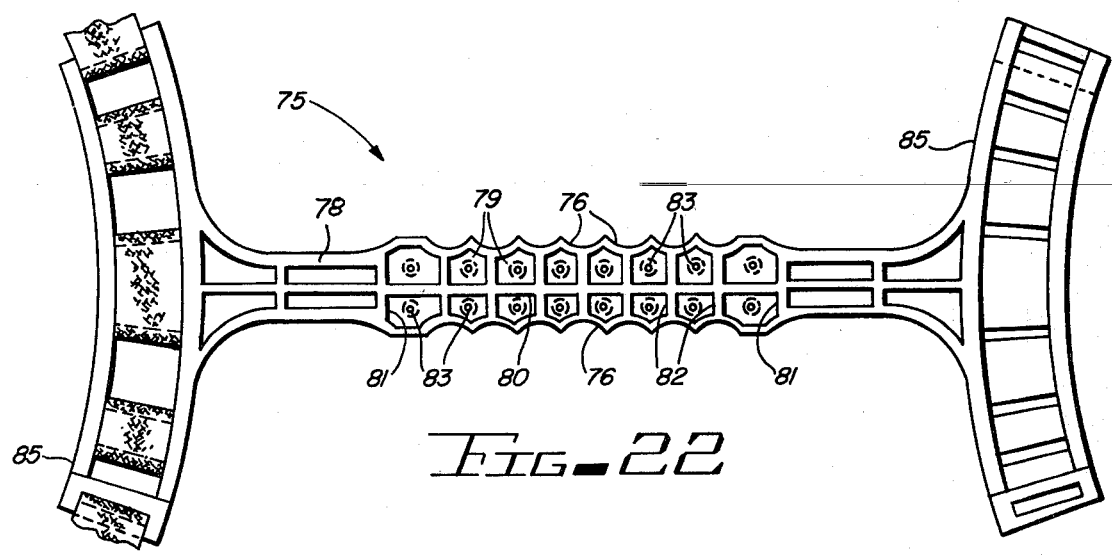
FIG. 22 is a plan view of yet another variation of the traction member.

As described in the copending application Ser. No. 130,583, now U.S. Pat. No. 4,280,544, traction may also be achieved by providing suction or vacuum pockets in the traction members. This approach is disclosed in the illustration of FIGS. 22-24 wherein the traction member 75 comprises a generally rectangular strip having scalloped edges 76. The outer surface 77 of the traction member that bears against the road surface is generally planar as shown in FIG. 24. The inner surface 78 as shown in FIG. 22 has formed therein a plurality of suction cavities 79 formed by the walls of the scalloped edges 76, a central longitudinal wall 80, end walls 81, and transverse intermediate walls 82. A plurality of spaced apart apertures 83 are formed in the plastic material and extend from the suction cavities 79 towards the planar outer surface 77 of the traction member 75. Recesses 84 are formed in outer surface 77 of traction member 75 in alignment with apertures 83. The recesses have a substantial diameter and extend to a depth of approximately one-half the thickness of the material between the outer surface and cavities 79. Continuing from the base of each of recesses 84 to the suction cavities 79 are apertures 83 of relatively small diameter. Thus, there is provided a continuing air passage between the outer face 77 of the traction member 75 and suction cavities 79. As the tire rolls along a road surface, traction members 75 contact the road surface, producing a vacuum and maintaining a suction within the suction cavities 79 which, through recesses 84 and apertures 83, provide a relatively high degree of traction between the traction members, the tire and the road surface.

Figure 23:
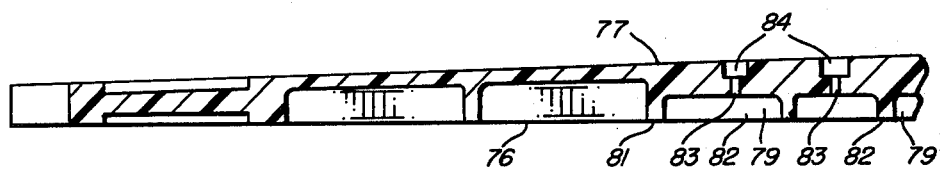
FIG. 23 is a cross-sectional view of FIG. 22 taken along the line 23—23.
Figure 24:
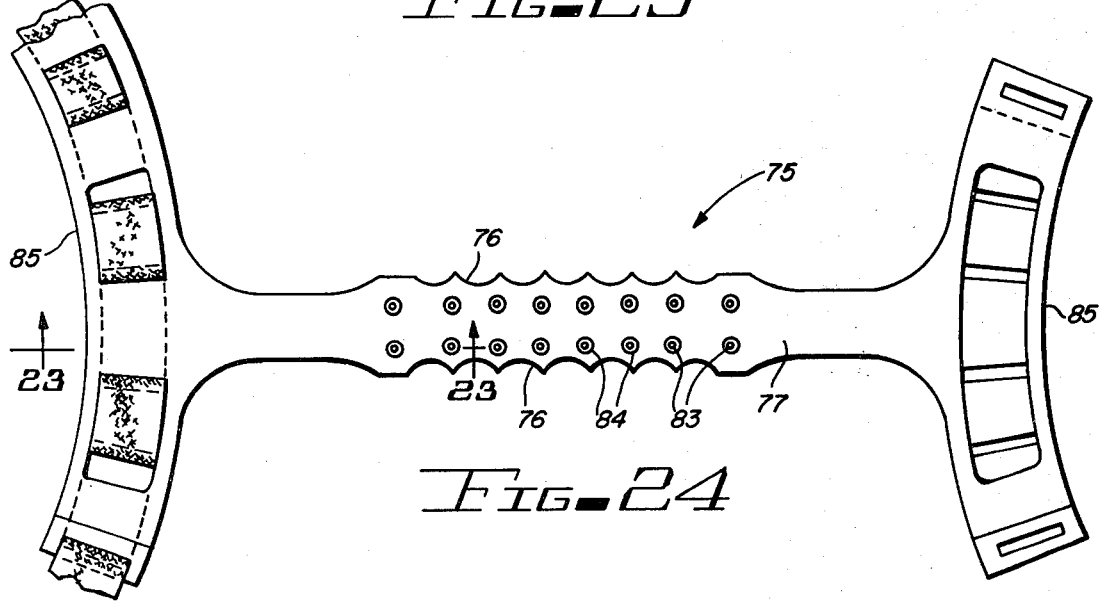
FIG. 24 is another plan view of the device of FIG. 22 as seen from the opposite side.

While the embodiment of FIGS. 22-24 are shown to utilize fastening members 85 that are the same as members 16 of FIGS. 1-7, it will be recognized that the variations of FIGS. 8-11 may be applied here as well. It should also be noted that one or more studs or rows of studs may be attached to the traction member 75 thereby combining the benefits of studs 14, 34, 56 and 63 with the suction features of FIGS. 22-24.

An improved wheel mounted traction device is thus disclosed in accordance with the stated objects of the invention, and although but a few embodiments of the invention have been illustrated and described, it will be apparent to those skilled in the art that various changes and modifications may be made therein without departing from the spirit of the invention or from the scope of the appended claims.

What is claimed is:

1. A wheel mountable device for increasing the traction of a tire on a road surface comprising:
   a plurality of traction elements secured together in an endless chain,
   said elements comprising a plastic body each having an elongated traction member having generally planar inner and outer surfaces for extending laterally across the width of the tire and a pair of fastening members formed to extend laterally one across each end of said traction member,
   each of said fastening members being arcuate in shape to fit around and conform to sidewalls of the tire, means for detachably mounting at least one stud of wear resistant material to at least one traction member of at least one of said elements, said means comprising a bracket for wrapping around a part of said inner surface of said traction member, said stud being secured to said bracket for extending through said traction member laterally thereof and outwardly of its outer surface, and fastening means attached to said fastening members of said traction members for releasably securing said traction elements in an endless chain for mounting around the circumference of a tire, whereby the inner surfaces of said traction members abut the outer periphery of the tire such that as the tire rolls along a road surface the traction members contact the road surface with the stud providing added traction for the tire.

2. The wheel mounted device set forth in claim 1 wherein:

said wear resistant material comprises hardened steel.

3. The wheel mounted device set forth in claim 1 wherein:

said wear resistant material comprises ceramic.

4. The wheel mounted device set forth in claim 1 wherein:

said bracket is molded in a surface of said traction member, and said stud is secured to said bracket for extending laterally thereof and outwardly of said outer surface of said traction member.

5. The wheel mounted device set forth in claim 4 in further combination with:

a plurality of second studs secured to said bracket for extending laterally thereof and outwardly of said outer surface of said traction member.

6. The wheel mounted device set forth in claim 1 wherein:

said fastening members are provided with a plurality of spacedly postioned slots arranged along their lengths, and said fastening means comprises a pair of straps one threaded through each of the slots of said elements on a different common end of said traction members.

7. The wheel mounted device set forth in claim 1 wherein:

said fastening members are provided with a plurality of spacedly positioned lugs extending outwardly thereof along its length, and said fastening means comprises a pair of cords each weaved around said lugs at a different common end of said traction members for holding when its ends are fastened together the chain formed by said elements to the tire.

8. The wheel mounted device set forth in claim 1 wherein:

said inner surface of said traction member is provided with one or more cavities, whereby when the traction members contact the rod surface the tire seals by suction action of the cavities the device to the tire.

9. The wheel mounted device set forth in claim 1 in further combination with:

a plurality of spacedly arranged suction cavities formed in the inner surface of said traction member, a plurality of spacedly arranged recesses formed in the outer surface of each traction member, and a plurality of apertures, one extending between each of said suction cavities and said recesses in said outer surface of each traction member, said apertures having a smaller diameter than the diameter of said recesses, whereby when said traction members contact the road surface with the tire, the tire seals said recesses and said apertures to maintain a suction condition in said cavities until broken by the traction member being lifted away from the road surface by the tire.

* * * * *

UNITED STATES PATENT OFFICE
CERTIFICATE OF CORRECTION

Patent No. 4,346,748    Dated   August 31, 1982

Inventor(s)   John P. Bagoy and Joseph A. Riendl

It is certified that error appears in the above-identified patent and that said Letters Patent are hereby corrected as shown below:

Claim 8, line 5, after "the" (second occurrence), delete "rod" and substitute ---road---.

Signed and Sealed this

Twenty-sixth Day of October 1982

[SEAL]

Attest:

Attesting Officer

GERALD J. MOSSINGHOFF

Commissioner of Patents and Trademarks